(12) United States Patent
Nagaraj et al.

(10) Patent No.: US 7,840,085 B2
(45) Date of Patent: Nov. 23, 2010

(54) ELECTRONIC VIDEO IMAGE STABILIZATION

(75) Inventors: Raghavendra C. Nagaraj, San Diego, CA (US); Narendranath Malayath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1136 days.

(21) Appl. No.: 11/487,078

(22) Filed: Jul. 14, 2006

(65) Prior Publication Data

US 2007/0236578 A1 Oct. 11, 2007

Related U.S. Application Data

(60) Provisional application No. 60/790,514, filed on Apr. 6, 2006.

(51) Int. Cl.
*G06K 9/40* (2006.01)

(52) U.S. Cl. .................. 382/254; 382/260; 382/274; 382/275

(58) Field of Classification Search .......... 382/260, 382/274, 275
See application file for complete search history.

(56) References Cited

U.S. PATENT DOCUMENTS

| | | | |
|---|---|---|---|
| 5,835,138 A | | 11/1998 | Kondo |
| 7,103,203 B2 * | | 9/2006 | Deschamps ............... 382/128 |
| 7,130,443 B1 * | | 10/2006 | Werner et al. ............... 382/100 |
| 7,184,991 B1 * | | 2/2007 | Wentland et al. ............. 706/45 |
| 7,188,092 B2 * | | 3/2007 | Wentland et al. ............. 706/48 |
| 2004/0001147 A1 | | 1/2004 | Vella et al. |
| 2006/0017814 A1 | | 1/2006 | Pinto et al. |

FOREIGN PATENT DOCUMENTS

| | | |
|---|---|---|
| EP | 1075147 A1 | 2/2001 |
| EP | 1117251 A1 | 7/2001 |

OTHER PUBLICATIONS

PCT Search Report, Sep. 12, 2007.

* cited by examiner

*Primary Examiner*—Yosef Kassa
(74) *Attorney, Agent, or Firm*—Timothy F. Loomis; John Rickenbrode (57) ABSTRACT

This disclosure describes electronic video image stabilization techniques for imaging and video devices. The techniques involve determining motion and spatial statistics for individual macroblocks of a frame, and determining a global motion vector for the frame based on the statistics of each of the macroblocks. In one embodiment, a method of performing electronic image stabilization includes performing spatial estimation on each of a plurality of macroblocks within a frame of an image to obtain spatial statistics for each of the macroblocks, performing motion estimation on each of the plurality of macroblocks to obtain motion statistics for each of the macroblocks, integrating the spatial statistics and the motion statistics of each of the macroblocks to determine a global motion vector for the frame, and offsetting the image with respect to a reference window according to the global motion vector.

35 Claims, 10 Drawing Sheets

ELECTRONIC VIDEO IMAGE STABILIZATION

This application claims the benefit of U.S. Provisional Application Ser. No. 60/790,514, filed Apr. 6, 2006, the entire content of which is incorporated herein by reference.

TECHNICAL FIELD

The disclosure relates to video processing and, more particularly, techniques for electronic image stabilization in electronic video applications.

BACKGROUND

As imaging devices become lighter and smaller, the images captured by such devices are more susceptible to quality degradation due to inadvertent shaking. In still image capture, the shake may result in a blurry image. In video capture, the shake may result in shaking or jitter in the video image. Shake and jitter can make it difficult for the human visual system to focus and concentrate on a region or object of interest within the video. When this shake appears in conjunction with genuine motion in the video, the adverse effects can be compounded. In either case, the quality of the viewing experience of the video or image is reduced.

Image stabilization systems attempt to compensate images for shaking to produce better image quality. Image stabilization systems generally fall into three main categories: optical image stabilizers (OIS), mechanical image stabilizers (MIS), and electronic image stabilizers (EIS). OIS systems employ an adjustable lens that morphs the image before it reaches the sensor, with the lens being controlled by an external motion sensor. MIS systems stabilize the entire camera and not the image captured by the camera. In particular, MIS systems typically use the center of gravity of the camera, a counterbalance system, and the camera operator's body to maintain smooth motion.

EIS systems employ signal processing algorithms to alter the captured image. Some EIS systems work well in many situations, but may suffer from an inability to differentiate genuine motion from unwanted shaking. Zooming EIS involves increasing the size of a captured image by zooming, and then zooming within the image to select a slightly smaller image that compensate for movement caused by shaking. Oversized EIS involves capturing an image slightly larger than a required resolution, and panning within the over-sized image to compensate for movement caused by shaking.

SUMMARY

This disclosure describes electronic image stabilization techniques useful for devices with video imaging capabilities. The techniques described in this disclosure effectively differentiate between unwanted shaking of the device and genuine motion occurring in a captured scene. In operation, a video frame in a video sequence is divided into a plurality of non-overlapping macroblocks. Upon calculation of spatial and motion statistics, a motion vector is determined for each macroblock. The motion vector indicates movement of the macroblock relative to a corresponding macroblock in another frame in the video sequence. The spatial statistics indicate a mean and variance of macroblocks within the frame.

The spatial and motion statistics for the macroblocks are integrated to obtain a global motion vector for the frame. Stabilization involves application of an offset to the frame based on the global motion vector to compensate for shake. For example, the global motion vector can be used to pan within an over-sized image to select a slightly smaller image that compensates for shaking. The spatial and motion statistics, which may already be available for purposes of encoding the frame, may also be used to support electronic image stabilization. In this manner, spatial and motion statistics support an efficient stabilization technique that is also effective in differentiating between shaking and genuine motion.

In one embodiment, this disclosure provides a device comprising a spatial estimation module that generates spatial statistics for macroblocks within a video frame, a motion estimation module that generates motion statistics for the macroblocks within the video frame, a motion integration module that integrates the spatial statistics and the motion statistics to determine a global motion vector for the frame and a stabilization module that applies an offset to an image defined by the macroblocks based on the global motion vector.

In another embodiment, the disclosure provides a method of performing electronic image stabilization comprising generating spatial statistics for macroblocks within a video frame, generating motion statistics for the macroblocks within the video frame, integrating the spatial statistics and the motion statistics to determine a global motion vector for the frame, and applying an offset to an image defined by the macroblocks based on the global motion vector.

In another embodiment, the disclosure provides a device for performing electronic image stabilization comprising means for generating spatial statistics for macroblocks within a video frame, means for generating motion statistics for the macroblocks within the video frame, means for integrating the spatial statistics and the motion statistics to determine a global motion vector for the frame, and means for applying an offset to an image defined by the macroblocks based on the global motion vector.

These and other techniques described herein may be implemented in hardware, software, firmware, or any combination thereof. If implemented in software, the software may be executed in a digital signal processor (DSP) or other type of processor. The software that executes the techniques may be initially stored in a computer readable medium and loaded and executed in the DSP for effective image stabilization of captured images.

Accordingly, this disclosure also contemplates a computer-readable medium comprising instructions that upon execution in a device cause the device to perform spatial estimation on each of a plurality of macroblocks within a frame of an image to obtain spatial statistics for each of the macroblocks, and perform motion estimation on each of the plurality of macroblocks to obtain motion statistics for each of the macroblocks. The computer-readable medium further comprises instructions that upon execution in a device cause the device to integrate the spatial statistics and the motion statistics of each of the macroblocks to determine a global motion vector for the frame, and offset the image with respect to a reference window according to the global motion vector.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
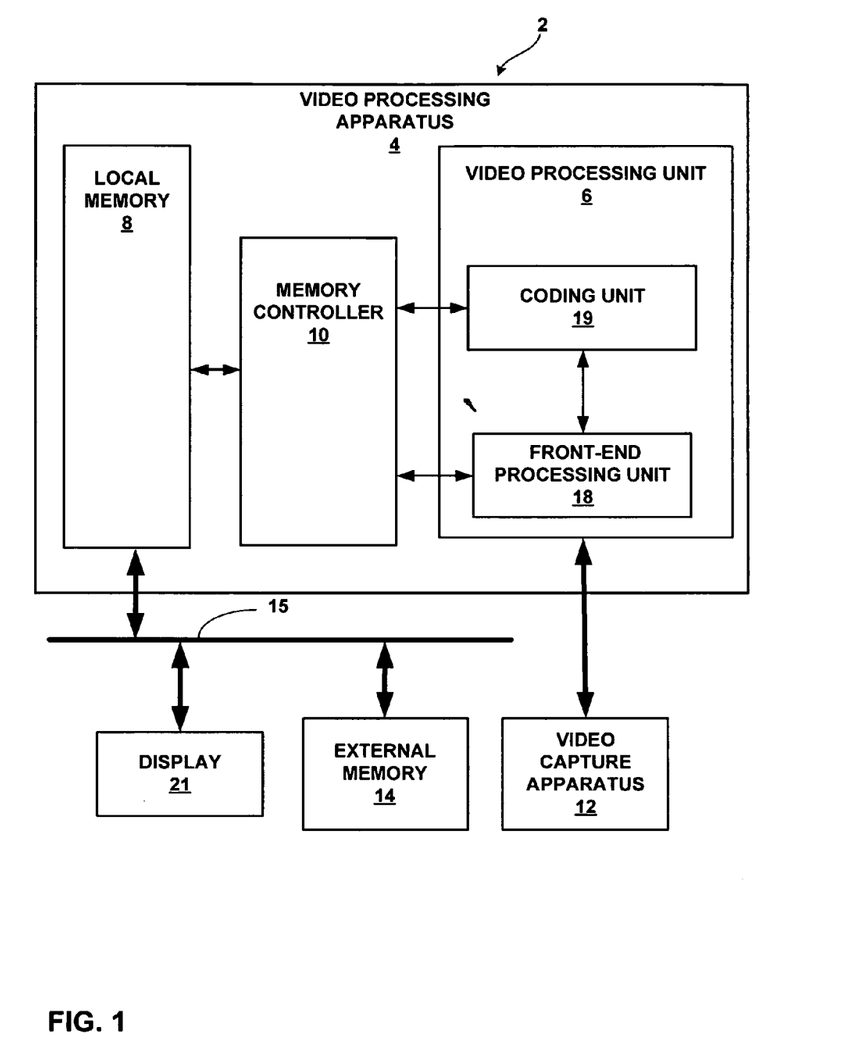
FIG. 1 is block diagram of an exemplary video processing device equipped to perform scalable electronic image stabilization in accordance with this disclosure.

FIG. 1 is block diagram of an exemplary device 2 that may implement scalable electronic image stabilization techniques in accordance with this disclosure. Device 2 may form part of a digital video processing device capable of coding video data. The digital video processing device may process video obtained by a video capture device, such as a video camera, or a video archive that stores previously captured video. By way of example, device 2 may form part of a digital video camera, a laptop computer, a desktop computer, a wireless communication device such as a cellular or satellite radio telephone, a personal digital assistant (PDA), or any device with digital video capabilities. Video capture devices may be susceptible to undesirable shaking that undermines video quality. Motion estimation can be used for image stabilization. However, motion may occur due to either unintended shaking of the video capture device or intended movement resulting from panning, zooming, tilting or other operations, as well as actual motion occurring in the scene being captured. Therefore, the application of motion estimation to provide effective video stabilization can be challenging. The image stabilization techniques disclosed herein may compensate for unintended movements while maintaining the presence of intended movements.

Video processing apparatus 4 operates to provide electronic video image stabilization by determining a global motion vector for each video frame in a sequence of video frames. Video processing apparatus 4 uses the global motion vector, as will be described in further detail, to compensate for the movement of the image created by the shake. The global motion vector represents the overall movement of an image within the current video frame relative to an image within another video frame, such as a previous video frame.

Video processing apparatus 4 obtains the global motion vector by breaking the frame into non-overlapping blocks, and performing spatial estimation and motion estimation on each block to determine spatial and motion statistics for each block. In some embodiments, video processing apparatus 4 may use spatial and motion statistics generated for video encoding. Video processing apparatus 4 may generate a motion vector for each block in the video frame based on the spatial and motion statistics.

Video processing apparatus 4 integrates all of the information obtained for each individual block to obtain the global motion vector. In this manner, video processing apparatus 4 compensates the capture video frame to substantially remove the appearance of motion caused by inadvertent translational motion of device 2, e.g., due to shaking.

Video processing apparatus 4 may store raw video data and perform various video processing techniques on such data. Video processing apparatus 4 may comprise a "chip set" that includes a digital signal processor (DSP) and on-chip memory. In other cases, apparatus 4 may comprise any combination of processors, hardware, software or firmware. Also, apparatus 4 may comprise a single integrated chip.

In the example of FIG. 1, video processing apparatus 4 includes local memory 8, a memory controller 10 and a video processing unit 6. Video processing unit 6 includes a front-end processing unit 18, and may also include a coding unit 19. Front-end processing unit 18 may perform front-end operations such as filtering, demosaicing, lens rolloff correction, scaling, color correction, color conversion, noise reduction filtering, spatial filtering, and other operations, in addition to video image stabilization, as described in this disclosure. In some embodiments, front-end processing unit 18 may perform the techniques of this disclosure and may include a plurality of image processing modules, as discussed in further detail below. In other embodiments, each of front-end processing unit 18 and coding unit 19 may include one or more of the video processing modules that perform the techniques of this disclosure. In some cases, front-end processing unit 18 may cooperate with coding unit 19. For example, front-end processing unit 18 may obtain spatial and motion statistics and provide them to coding unit 19 for purposes of coding, thereby avoiding duplication of computation of such statistics. Instead, the spatial and motion statistics, or portions thereof, may be used for both video coding within coding unit 19 and image stabilization within front-end processing unit 18.

Coding unit 19 may be provided when the apparatus 4 is equipped to encode video obtained in video stream, e.g., for compressed storage or transmission to remote devices over a wired or wireless communication medium. In this case, coding unit 19 may perform video coding, which may apply one or more video compression techniques, such as inter-frame compression or intra-frame compression. For example, coding unit 19 may implement motion estimation and motion compensation techniques to exploit temporal or inter-frame data correlation to provide for inter-frame compression. Alternatively, or additionally, coding unit 19 may perform spatial estimation and intra-prediction techniques to exploit spatial or intra-frame data correlation to provide for intra-frame compression. In some embodiments, coding unit 19 may use spatial and motion statistics obtained by front-end processing unit 18, e.g., to reduce duplication of computation. Alternatively, coding unit 19 may apply its own motion estimation, motion compensation and spatial estimation techniques to the video produced by front-end processing unit.

In general, coding unit 19 may apply video coding according to any of a variety of video coding standards, such as MPEG-1, MPEG-2, MPEG-4, ITU H.261, ITU H.263, ITU H.264, and/or other standards. Coding unit 19 also may be used to compress still images. Coding unit 19 may form part of a combined encoder/decoder (CODEC). A CODEC may be implemented within hardware, software, firmware, a DSP, a microprocessor, an application specific integrated circuit (ASIC), a field programmable gate array (FPGA), discrete hardware components, or various combinations thereof. Various digital filters and hardware components may be provided to support both encoding and decoding applications.

Local memory 8 generally stores raw video data, and may also store processed video data following any processing that is performed by video processing unit 6. For example, memory 8 also may store encoded video data generated by coding unit 19. Memory controller 10 controls the memory organization within local memory 8. Memory controller 10 also controls memory loads from local memory 8 to video processing unit 6, and write backs from video processing unit 6 to local memory 8.

Device 2 may include a video capture apparatus 12 to capture video. For example, video capture apparatus 12 may be a video camera integrated within another device, such as a mobile telephone, forming a so-called camera phone or video phone. Alternatively, video capture apparatus 12 may be a camera that is coupled to provide video to video processing apparatus, either directly by wired or wireless media, e.g., a Universal Serial Bus (USB) or IEEE 1394 connection, or indirectly by exchange of removable storage media such as a flash memory card, magnetic hard drive, or other media. Video capture apparatus 12 may comprise a set of image sensors that include color filter arrays (CFAs) arranged on a surface of the respective sensors, e.g., in a Bayer pattern.

When video capture apparatus 12 is integrated with video processing apparatus 4, the image sensors may be coupled directly to video processing unit 6 to avoid latency in the image processing of viewfinder images, i.e., images presented to a user substantially in real time via a relatively small format, low resolution display. Other types of image sensors, however, could also be used to capture video data. Other exemplary sensors that could be used to realize image capture apparatus 12 include arrays of solid state sensor elements such as complementary metal-oxide semiconductor (CMOS) sensor elements, charge coupled device (CCD) sensor elements, or the like.

Video obtained by video capture apparatus 12 is processed according to this disclosure to provide image stabilization to compensate for undesired shaking. Video capture apparatus 12 may capture a video frame having a larger size than the size necessary for video encoding. In this manner, the captured video frame provides excess area to permit electronic image stabilization. In particular, a desired image within a larger captured video frame may be moved vertically, horizontally, or both based on a global motion vector to compensate for shaking.

As an alternative to a video capture apparatus 12, video processing apparatus 4 may process video obtained from a video archive that stores previously captured video. Hence, image stabilization may be applied immediately, substantially in real time, to video as it is capture, or applied as a post-processing step to previously captured video. In either case, image stabilization compensates shaking in the video prior to encoding, to enhance the quality of the video ultimately viewed by a user. Immediate application of image stabilization as the video is captured may be desirable to enhanced viewfinder image quality, as well as ultimate raw or encoded video quality.

Device 2 may include a display 21 that displays a real-time sequence of viewfinder images sampled by image capture apparatus 12 to simulate real-time video. These images may be relatively small in width. Accordingly, as such small images are captured, they may be loaded directly into front-end processing unit 18 line-by-line. After processing, the viewfinder images may be written to local memory 8 or external memory 14. The processed images may then be sent to display 21 for presentation to the user. Display 21 may also be used to display still images following the processing of such still images by front-end processing unit 18. In some cases, however, still images could be processed and stored without being displayed by device 2. Following the capture of a still image, local memory 8 may store raw data.

In some cases, device 2 may include multiple memories. For example, device 2 may include an external memory 14, which typically comprises a relatively large memory space. External memory 14, for example, may comprise dynamic random access memory (DRAM), or FLASH memory. In other examples, external memory 14 may comprise a non-volatile memory or any other type of data storage unit. In contrast to external memory 14, local memory 8 may comprise a smaller and faster memory space, although this disclosure is not necessarily limited in this respect. By way of example, local memory 8 may comprise synchronous dynamic random access memory (SDRAM).

In any case, memories 14 and 8 are merely exemplary, and may be combined into the same memory, or may be implemented in a number of other configurations. In one embodiment, local memory 8 forms a part of external memory 14, typically in SDRAM. In this case, both of memories 8 and 14 are "external" in the sense that neither memory is located "on-chip" with video processing unit 6. Accordingly, only the line buffers of image processing unit 6 may be "on-chip" memory.

Device 2 may also include, in some embodiments, a transmitter (not shown) to transmit the processed video or coded video, or other information, to another device, e.g., via a wired or wireless communication medium. Also, in some embodiments, device 2 may include a receiver to receive processed video or coded video, or other information, from another device. Local memory 8, display 21 and external memory 14 (and other components if desired) can be coupled via a communication bus 15. A number of other elements may also be included in device 2, but are not specifically illustrated in FIG. 1 for simplicity and ease of illustration. The architecture illustrated in FIG. 1 is merely exemplary, as the techniques described herein may be implemented with a variety of other architectures.

Figure 2:
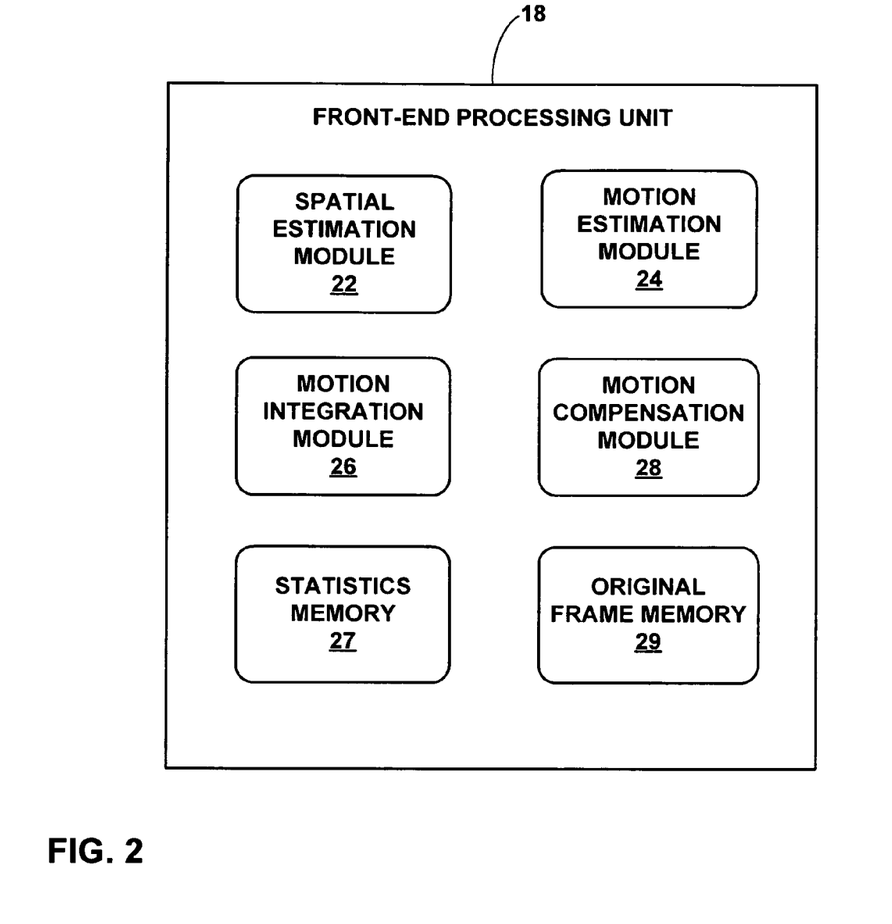
FIG. 2 is a block diagram illustrating an exemplary front-end processing unit useful in the device of FIG. 1.

FIG. 2 is a block diagram illustrating an example front-end processing unit 18 of FIG. 1 in further detail in accordance with the principles of this disclosure. As shown in FIG. 2, front-end processing unit 18 may include a spatial estimation module 22 and motion estimation module 24. In addition, front-end processing unit 18 may include a motion integration module 26, a motion compensation module 28, a statistics memory 27 and an original frame memory 29. Front-end processing unit 18 divides a video frame into non-overlapping macroblocks. Spatial estimation module 22 and motion estimation module 24 both analyze each of the macroblocks of the frame, relative to corresponding, i.e., most closely matching, macroblocks in another frame, to obtain spatial and motions statistics, respectively.

Statistics memory 27 stores the spatial and motion statistics. Original frame memory 29 stores the video frame obtained by the video capture device. The video frame stored in original video frame memory 29 may include undesirable shake. Motion integration module 26 generates a global motion vector based on the spatial and motion statistics generated by spatial estimation module 22 and motion estimation module 24. Motion compensation module 28 uses the global motion vector to apply an offset to an image within the received video frame, and thereby compensate for shaking.

Figure 3:
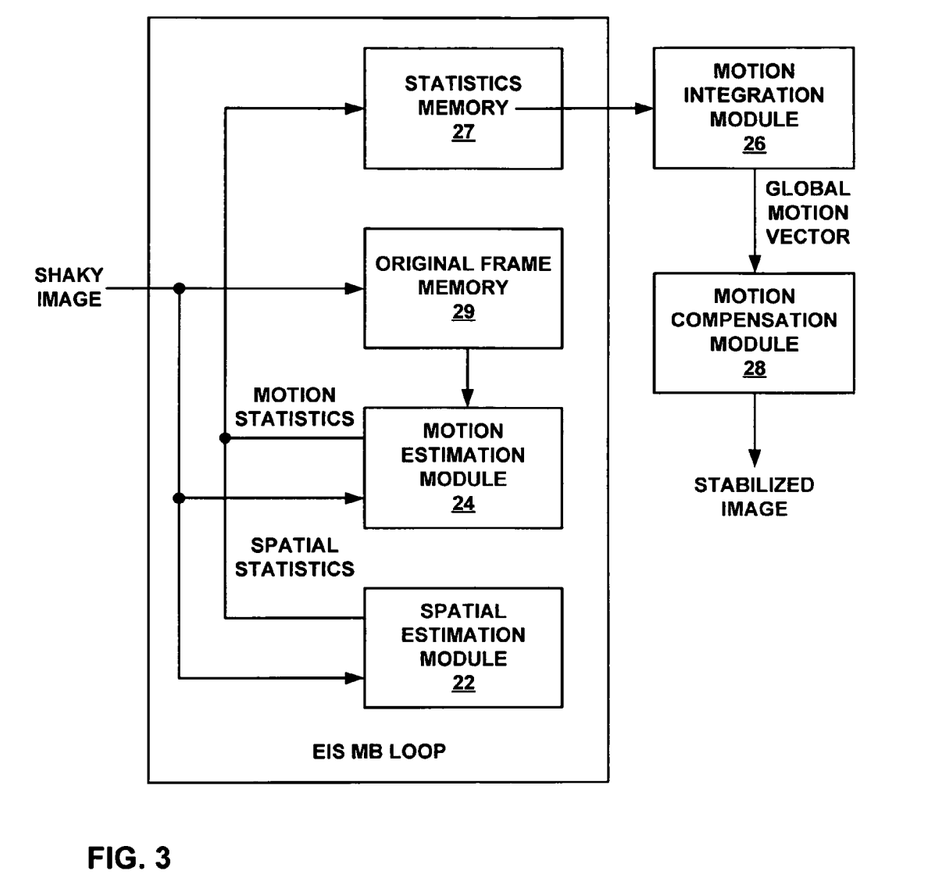
FIG. 3 is a block diagram illustrating operation of various components of the processing unit in FIG. 2 to perform scalable electronic image stabilization.

FIG. 3 is a block diagram illustrating operation of various components of the processing unit in FIG. 2 to perform scalable electronic image stabilization. As shown in FIG. 3, spatial estimation module 22, motion estimation module 24, statistics memory 27, original frame memory 29 form par to of an electronic image stabilization (EIS) macroblock (MB) loop. The EIS MB loop processes a shaky image to produce spatial and motion statistics. Motion integration module 26 receives the statistics from statistics memory 27, and generates the global motion vector for application by motion compensation module 28 to produce a stabilized image.

Spatial estimation module 22 performs spatial estimation on individual non-overlapping macroblocks from the current video frame. Spatial estimation provides an indication of the characteristics of the frame, e.g., in terms of texture. In one embodiment, performing spatial estimation comprises measuring the mean and variance of the luminance values associated with pixels within the macroblock. Spatial estimation module 22 stores the mean and the variance as spatial statistics in statistics memory 27, which may form part of local memory 8.

Motion estimation module 24 performs motion estimation on the individual non-overlapping macroblocks. Motion estimation module 24 determines a motion vector for each macroblock in the current frame to represent the displacement of that macroblock from its position in the previous frame. In other words, the motion vector indicates the displacement of the macroblock in the current frame relative to a macroblock in a previous frame that is found to most closely match the current macroblock. Motion estimation module 24 performs this function by comparing each macroblock in the current frame with macroblocks in its surrounding area in the previous frame to find the best match. Motion estimation module 24 may also determine a sum-of-absolute-difference (SAD) between a given macroblock in the current frame and a candidate macroblock from a search area within the previous frame. Motion estimation module 24 stores the motion vectors and the SAD as motion statistics in local memory 8.

The spatial estimation and motion estimation operations provided by modules 22, 24 may generally conform to similar operations performed in video encoding, such as encoding according to the MPEG-1, MPEG-2, MPEG-4, ITU H.261, ITU H.263, or ITU H.264 standards. Once the spatial and motion statistics for each of the individual non-overlapping macroblocks of the current frame have been stored in statistics memory 27, motion integration module 26 integrates the individual motion vectors into a single global motion vector that will be used to compensate for movement created by a shake. Motion integration module 26 may employ a non-linear integration function as described below. For example, in one embodiment, motion integration module 26 builds a two-dimensional (2D) histogram having bins corresponding to each of the possible motion vectors, and chooses the motion vector associated with the histogram bin that has the maximum value as the global motion vector. Once motion integration module 26 has calculated the global motion vector, motion compensation module 28 offsets the current image as a whole by this vector. Again, the current image may correspond to a region within a larger image that has been over-sized for the purpose of permitting image stabilization, i.e., by shifting the smaller image vertically, horizontally, or both within the larger image. The shifted image may then be sampled for further processing, such as video encoding.

In some embodiments, one or more of the image processing modules shown in the exemplary front-end processing unit 18 of FIGS. 2 and 3 may reside in locations of device 2 other than front-end processing unit 18. For example, spatial estimation module 22 and motion estimation module 24 may be located within coding unit 19, such that image stabilization and video encoding rely on common hardware, firmware, and/or software units for spatial estimation and motion estimation. In addition, front-end processing unit 18 may include other image processing modules not shown. By way of example, additional modules of front-end processing unit 18 may include a 2-dimensional filtering module, a demosaicing module, a lens rolloff correction module, a scaling module, a color correction module, a color conversion module, a noise reduction filtering module, a spatial filtering module, or other types of modules.

Figure 4:
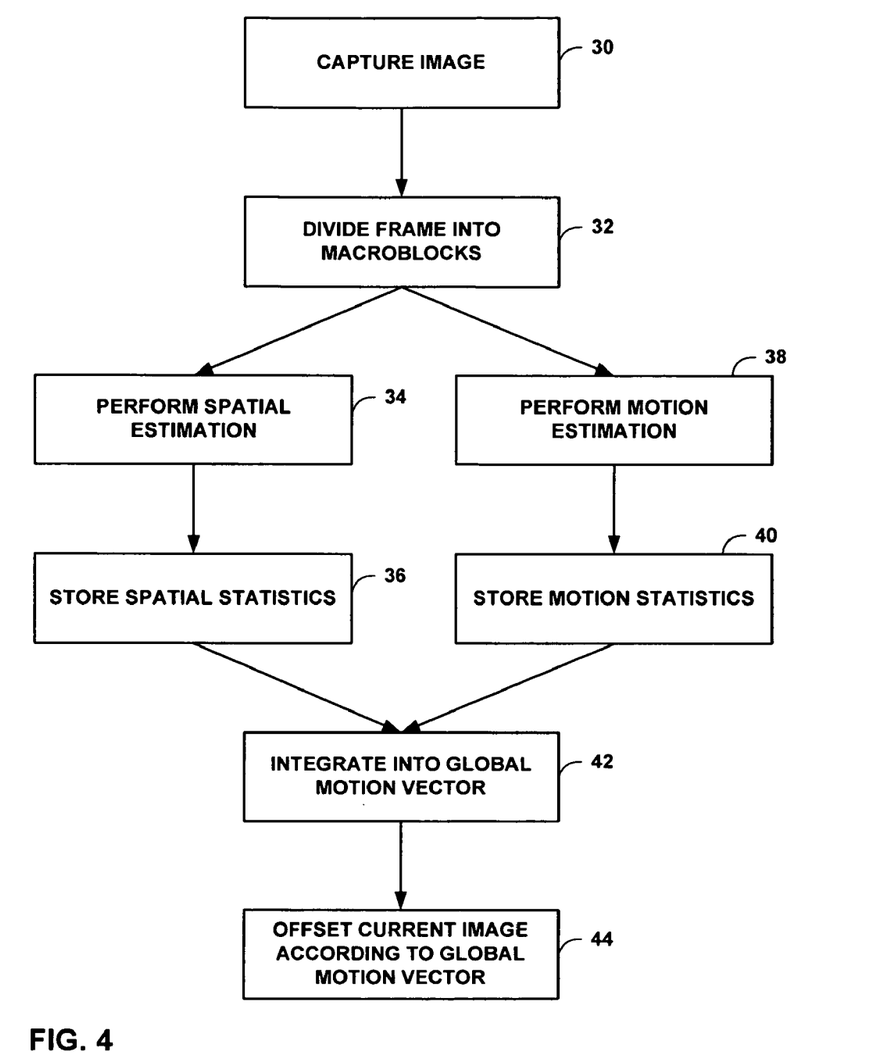
FIG. 4 is a flow chart illustrating exemplary operation of the device of FIG. 1 in implementing scalable image stabilization techniques.

FIG. 4 is a flowchart illustrating exemplary operation of device 2 of FIG. 1 in implementing the techniques of this disclosure. Image capture apparatus 12 captures a video image forming a video frame in a series of frames (30). Image processing unit 6 receives the captured image. Front-end processing unit 18 divides a current frame of the image into macroblocks (32). For example, front-end processing unit 18 may divide the frame into macroblocks comprising sixteen-by-sixteen pixel arrays. Alternatively, the macroblocks may have smaller or larger sizes, such as eight-by-eight, four-by-four, eight-by-sixteen, four-by-eight, and so forth. Hence, the term "macroblock" may refer to an array of pixels within a video frame. The size of such an array may be fixed or variable, and may have a range of sizes. The pixels within a macroblock may be analyzed to provide a set of statistics that applies to the macroblock as a whole.

Spatial estimation module 22 performs spatial estimation on a set of individual non-overlapping macroblocks ($c_{ij} \epsilon C$) from the current frame (C) (34). Spatial estimation module 22 may perform spatial estimation of a macroblock by measuring the mean and variance of the macroblock. In one embodiment, spatial estimation module 22 measures the mean and variance according to the following equations:

$$mean_{ij} = \frac{1}{256} \sum_{m=0}^{15} \sum_{n=0}^{15} c_{ij}(m, n) \quad (1)$$

$$variance_{ij} = \frac{1}{256} \sum_{m=0}^{15} \sum_{n=0}^{15} |c_{ij}(m, n) - mean_{ij}|. \quad (2)$$

In this embodiment, spatial estimation module 22 does not measure the variance using the familiar squaring approximation, because the simple approximation shown (absolute value instead of squaring) may be sufficient for image stabilization purposes. However, a sum of squares may be used in other embodiments. Spatial estimation module 22 stores the mean and the variance as spatial statistics, for example, in local memory 8 (36).

Motion estimation module 24 performs motion estimation on the individual non-overlapping macroblocks of the current frame (38). For example, motion estimation module 24 determines a motion vector for each macroblock in the current frame that represents the displacement of that macroblock from its position in the previous frame, i.e., from the position of a closely matching macroblock in the previous frame. Motion estimation module 24 performs this function by comparing each macroblock in the current frame with its surrounding area in the previous frame to find the best match. For example, each macroblock is searched in a search area S of the previous frame. The size of the search area (SX, SY) may vary depending on the platform in which the techniques are implemented, and on the source video.

Motion estimation module 24 adaptively chooses the search area center (search_center$_{ij}{}^x$, search_center$_{ij}{}^y$) around either a motion vector predictor (mvp$_{ij}{}^x$, mvp$_{ij}{}^y$) or the (0, 0) vector. Motion estimation module 24 decides which vector to choose as the search area center based on the reliability of the motion in the neighborhood of the potential search area centers. This is denoted by spatiotemporal_rel_idx$_{ij}$, the calculation of which is shown in the next section. The motion vector predictor (mvp$_{ij}{}^x$, mvp$_{ij}{}^y$) is calculated based on the motion vectors of the neighboring macroblocks, as shown below:

$$mvp_{ij}{}^x = \text{Median}(mv_{i-1,j}{}^x, mv_{ij-1}{}^x, mv_{i+1,j-1}{}^x), \text{ and} \quad (3)$$

$$mvp_{ij}{}^y = \text{Median}(mv_{i-1,j}{}^y, mv_{ij-1}{}^y, mv_{i+1,j-1}{}^y), \quad (4)$$

where ($mv_{i-1,j}{}^x$, $mv_{i-1,j}{}^y$) is the motion vector of the left macroblock, ($mv_{ij-1}{}^x$, $mv_{ij-1}{}^y$) is the motion vector of the top macroblock, and ($mv_{ij+1}{}^x$, $mv_{i+1,j-1}{}^y$) is the motion vector of the left macroblock.

Motion estimation module 24 adaptively chooses the search area center as follows:

```
if(spatiotemporal_rel_idx_ij < search_center_threshold)
{
  search_center_ij^x = 0
  search_center_ij^y = 0
}
else
{
  search_center_ij^x = mvp_ij^x
  search_center_ij^y = mvp_ij^y
}.
```

The outcome of the above step is the motion vector ($mv_{ij}{}^x$, $mv_{ij}{}^y$) that resulted in the best match for the given macroblock in the current frame for which the search was performed.

The extent of the match may also be described by a quantitative measure. In one embodiment, motion estimation module 24 determines the sum-of-absolute-difference (SAD) (sad$_{ij}$) between the given macroblock ($c_{ij} \in C$) and a candidate macroblock from the search area ($s_j \in S$) as the quantitative measure. The SAD is given by the following equation:

$$sad_{ij} = \sum_{m=0}^{15}\sum_{n=0}^{15} |c_{ij}(m,n) - s_{ij}(m,n)|. \quad (5)$$

Motion estimation module 24 stores the motion vector for the macroblock and the SAD for the macroblock as motion statistics for the macroblock ($c_{ij} \in C$) (40).

Once front-end processing unit 18 has obtained the spatial and motion statistics for each of the individual non-overlapping macroblocks ($c_{ij} \in C$) of the current frame, motion integration module 26 integrates the individual motion vectors into a single global motion vector that will be used to compensate for movement created by a shake (42). Motion integration module 26 may employ a non-linear integration function as described below. In one embodiment, motion integration module 26 builds a two-dimensional (2D) histogram (histogram(p,q)) having bins corresponding to each of the possible motion vectors. However, motion integration module 26 may use other methods of integrating the individual motion vectors into a global motion vector. The two dimensions of the 2D histogram correspond to the horizontal and vertical directions of the frame. The bin corresponding to the motion vector ($mv_{ij}{}^x$, $mv_{ij}{}^y$) of each block ($c_{ij}$) is updated with a value/contribution (contribution$_{ij}$), as defined below.

The contribution reflects the reliability of its associated motion vector ($mv_{ij}{}^x$, $mv_{ij}{}^y$). Motion integration module 26 calculates three types of reliability indexes for this purpose: spatial_rel_idx$_{ij}$, temporal_rel_idx$_{ij}$, and spatiotemporal_rel_idx$_{ij}$, depending on the spatial, temporal, and spatio-temporal characteristics of $c_{ij}$. Motion integration module 26 calculates the reliability index spatial_rel_idx$_{ij}$ using variance$_{ij}$, which is normalized to a fixed scale (0 to max_rel_idx) as below:

spatial_rel_idx$_{ij}$=(variance$_{ij}$−variance_offset)/variance_scale, spatial_rel_idx$_{ij}$=MIN(max_rel_idx, MAX(0, spatial_rel_idx$_{ij}$)).

Motion integration module 26 calculates the reliability index temporal_rel_idx$_{ij}$ using sad$_{ij}$, which is normalized to a fixed scale (0 to max_rel_idx) as below:

temporal_rel_idx$_{ij}$=(sad$_{ij}$−sad_offset)/sad_scale, temporal_rel_idx$_{ij}$=MIN(max_rel_idx, MAX(0, temporal_rel_idx$_{ij}$)).

Motion integration module 26 calculates the reliability index spatiotemporal_rel_idx$_{ij}$ taking into account the homogeneity of the motion vectors of the neighboring blocks. Motion integration module 26 also normalizes this index to a fixed scale (0 to max_rel_idx) as below:

```
spatiotemporal_rel_idx_ij = max_rel_idx;
if(|mvp_ij^x - mv_{i-1,j}^x| > mvp_threshold)
  spatiotemporal_rel_idx_ij -= (max_rel_idx / 5);
if(|mvp_ij^x - mv_{ij-1}^x| > mvp_threshold)
  spatiotemporal_rel_idx_ij -= (max_rel_idx / 5);
if(|mvp_ij^x - mv_{i+1,j-1}^x| > mvp_threshold)
  spatiotemporal_rel_idx_ij -= (max_rel_idx / 5);
if(|mvp_ij^y - mv_{i-1,j}^y| > mvp_threshold)
  spatiotemporal_rel_idx_ij -= (max_rel_idx / 5);
if(|mvp_ij^y - mv_{ij-1}^y| > mvp_threshold)
  spatiotemporal_rel_idx_ij -= (max_rel_idx / 5);
if(|mvp_ij^y - mv_{i+1,j-1}^y| > mvp_threshold)
  spatiotemporal_rel_idx_ij -= (max_rel_idx / 5);
spatiotemporal_rel_idx_ij = MAX(0, spatiotemporal_rel_idx_ij).
```

Motion integration module 26 calculates the contribution (contribution$_{ij}$) as:

```
if(spatial_rel_idx_ij > spatial_threshold &&
   spatiotemporal_rel_idx_ij > spatiotemporal_threshold)
{
  contribution_ij = (spatial_rel_idx_ij + temporal_rel_idx_ij) / 2;
}
else
{
  contribution_ij = 0;
}.
```

Motion integration module 26 updates the histogram (histogram(p,q)) as below for each block $c_{ij}$:

$$\text{histogram}(mv_{ij}{}^x, mv_{ij}{}^y) \mathrel{+}= \text{contribution}_{ij}. \quad (6)$$

Motion integration module 26 chooses the histogram location that has the maximum value as the global motion vector ($P^x$, $P^y$):

$$(P^x, P^y) = (p, q) | \max \text{histogram}(p, q). \quad (7)$$

Once motion integration module 26 has calculated the global motion vector ($P^x$, $P^y$), motion compensation module 28 offsets the current image as a whole by this vector (44). The shifted image is then sampled for further processing. The current frame may be stored to be used as a reference frame for determining the global motion vector for the next frame.

Figure 5:
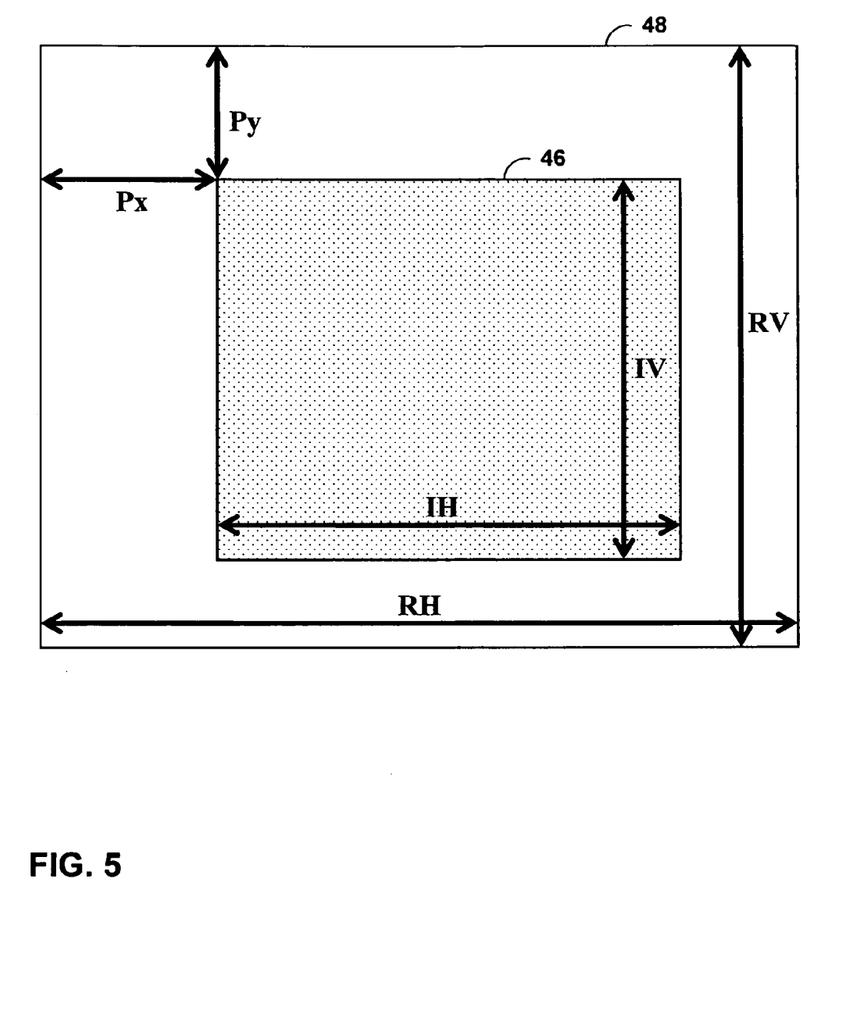
FIG. 5 is a diagram illustrating application of an image offset to an image within a video frame based on a global motion vector to support image stabilization.

FIG. 5 is a block diagram illustrating an exemplary current image 46 offset according to the global motion vector ($P^x$, $P^y$) within a larger reference window 48. The current image 46 has a vertical dimension IV and a horizontal dimension IH, and the reference window 48 has a vertical dimension RV and a horizontal dimension RH. Front-end processing unit 18 calculates a global motion vector ($P^x$, $P^y$) for each successive frame, so that each successive frame is displaced according to the global motion vector within reference window 48.

Figure 6:
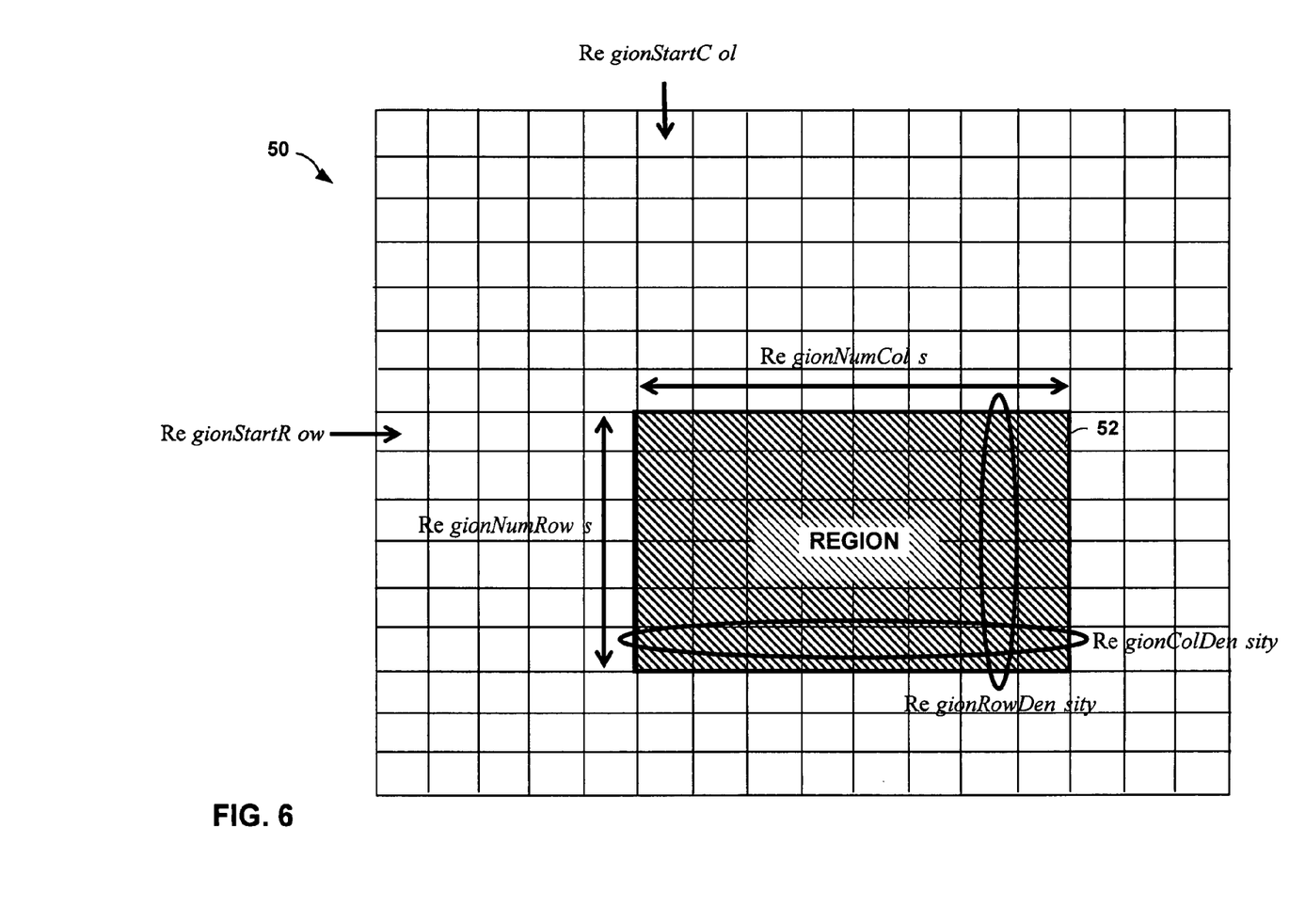
FIG. 6 is a diagram illustrating use of a region comprising a subset of macroblocks to establish a global motion vector for image stabilization.

FIG. 6 is a diagram illustrating an example frame 50 in which a region 52 comprises a subset of the macroblocks of the frame. FIG. 6 shows example parameters of region 52 that define scalable complexity of the techniques disclosed herein. The techniques described above may offer complexity scalability for minimal use of resources in performing electronic image stabilization. In particular, front-end processing unit 18 need not use each and every macroblock of the frame to determine the global motion vector for the frame. Instead, analysis of a subset of the macroblocks may yield an appropriate global motion vector for the frame. For example, in the exemplary embodiment described above, the step of performing motion integration requires finding the peak of a 2D histogram in order to find the global motion vector for frame 50. A subset of the blocks ($c_{ij} \in R$) may yield the peak in the 2D histogram. R is defined as a region that is a subset of C.

The region R should be large enough for the peak to be reliable, and should also encompass areas of reliable motion. The following parameters may be employed to define R as a function of C. RegionStartRow is the starting row of the region, in integer number of blocks. RegionStartColumn is the starting column of the region, in integer number of blocks. RegionNumRows is the number of rows in the region, in integer number of blocks. RegionNumCols is the number of columns in the region, in integer number of blocks. RegionRowDensity is the density of rows in the region (in percentage), and RegionColDensity is the density of columns in the region (in percentage). In some implementations, using a RegionColDensity of 100% is preferred for efficient use of hardware.

To maintain a reasonable degree of balance between performance and flexibility, a Digital Signal Processor (DSP), or other processing entity, may be used in combination with programmable hardware to implement the electronic image stabilization techniques of this disclosure. In this configuration, the DSP controls the programming and the executing of the various hardware components. An example of this architecture will now be described in connection with image stabilization.

Figure 7:
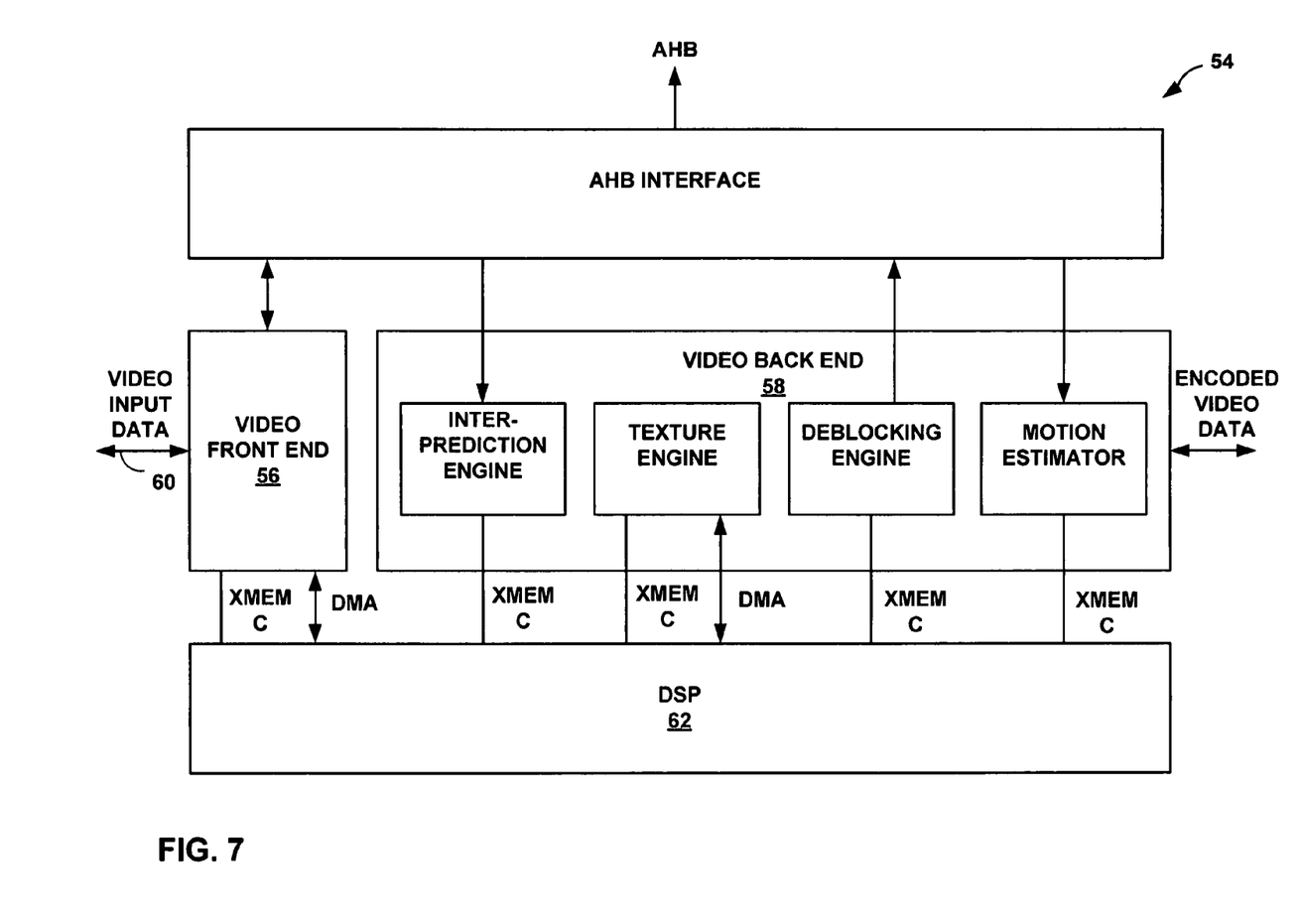
FIG. 7 is a block diagram illustrating an example video core of a mobile modem suitable for incorporation of a video processing device as described in this disclosure.

FIG. 7 is a block diagram illustrating an example video core 54 of a mobile station modem (MSM) platform for use in a wireless communication device, such as a mobile radio telephone. In the example of FIG. 1, video core 54 is accessible only from the DSP and not from the processor core. The video core 54 offers a power-efficient solution for the movement of pixels during video encoding and decoding; hence, video core 54 may be leveraged for all pixel-intensive operations of the electronic image stabilization techniques disclosed herein, such as spatial estimation and motion estimation. Because only a subset of the operations required for video encoding are required for electronic image stabilization, only a thin version of the video core need be utilized. Either the processor core or the DSP may house the motion integration aspect of the image stabilization algorithm.

As shown in FIG. 7, video core 54 may be partitioned between a video front end (VFE) 56 and a video back end (VBE) 58. In general, VFE 56 encapsulates functionality and pre-processing operations to support a variety of camera or camcorder applications, and includes a flexible inter-processor interface for controlling these operations. The primary task of VFE 56 is to process incoming video input data 60 in real-time. VFE 56 receives video input data 60, and processes the data to produce video output data into an acceptable format for VBE 16 based on commands and configuration parameters 25 received from a controller (not shown).

For example, VFE 56 may process the video input data 60 using the electronic image stabilization techniques described above. In addition, VFE 56 may format video input data 60 to produce video display data in a form suitable for display by a display module (not shown). VFE 56 stores video output data and video display data within a video memory (not shown) for access by VBE 58 and the controller, respectively. VFE 56 provides status information via the inter-processor interface to indicate the status of pending commands. VBE 58 may comprise any software application, hardware unit, or the like, that encodes or decodes video data. More specifically, VBE 58 may utilize the video output data to generate an encoded bit stream of video sequences.

When operating as an encoder, VBE 16 encodes the video output data, and may buffer the encoded bit stream within a video memory, e.g., for wireless transmission via a transmitter/receiver (not shown). For example, VBE 16 may comprise a JPEG still image encoder for a digital camera, an MPEG video encoder for a digital camcorder, and the like. VBE may be, therefore, a proprietary encoder or decoder, or may process video output data in accordance with one or more of a variety of data compression standards, such as MPEG-1, MPEG-2, MPEG-4, ITU H.261, ITU H.263, ITU H.264, and/or other standards.

Alternatively, or in addition, VBE 58 may operate as a decoder. More specifically, VBE 58 may receive a bit stream of encoded video sequences from the receiver/transmitter, and process the bit stream to produce decoded video sequences for processing and display by VFE 56. VFE 56 and VBE 58 may exchange control signals to trigger video processing operations. For example, the controller or VFE 56 may trigger encoding operations by VBE 58. When operating as a decoder, the controller or VBE 58 may trigger operations by VFE 56. VFE 56 and VBE 58 may be provided as standalone hardware or software modules, e.g., software modules for execution by a DSP 62, or combinations thereof.

Figure 8A:
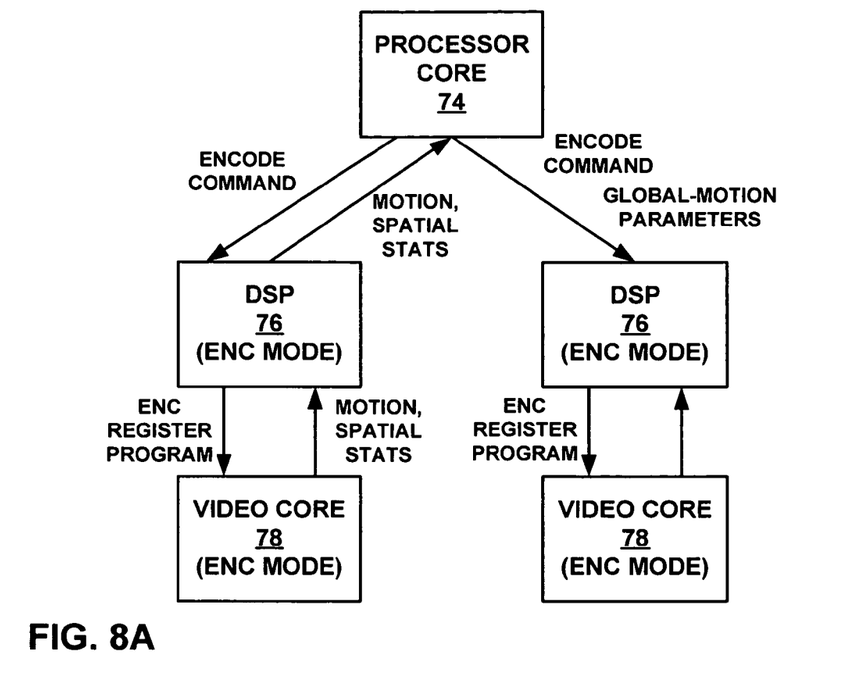
FIGS. 8A-8D are block diagrams illustrating example implementation schemes for implementing scalable image stabilization techniques in accordance with this disclosure.

FIGS. 8A-8D are block diagrams illustrating example implementation schemes for implementing the image stabilization techniques of the disclosure on the platform of FIG. 7 FIG. 8A is a block diagram illustrating one option for implementing image stabilization on the MSM7K platform. As shown in FIG. 8A, processor core 74 issues the "encode" command twice; once for image stabilization and again for actually encoding the frame. In the image stabilization phase, DSP 76 and video core 78 are run in an identical manner as if a frame was being encoded. In this phase, the motion and spatial statistics are sent back to processor core 74 on a per-macroblock basis to support image stabilization. Processor core 74 will then implement the motion integration techniques described above. The global motion vector calculated by processor core 74 is then programmed back during the next phase, in which the actual encoding is performed.

Figure 8B:
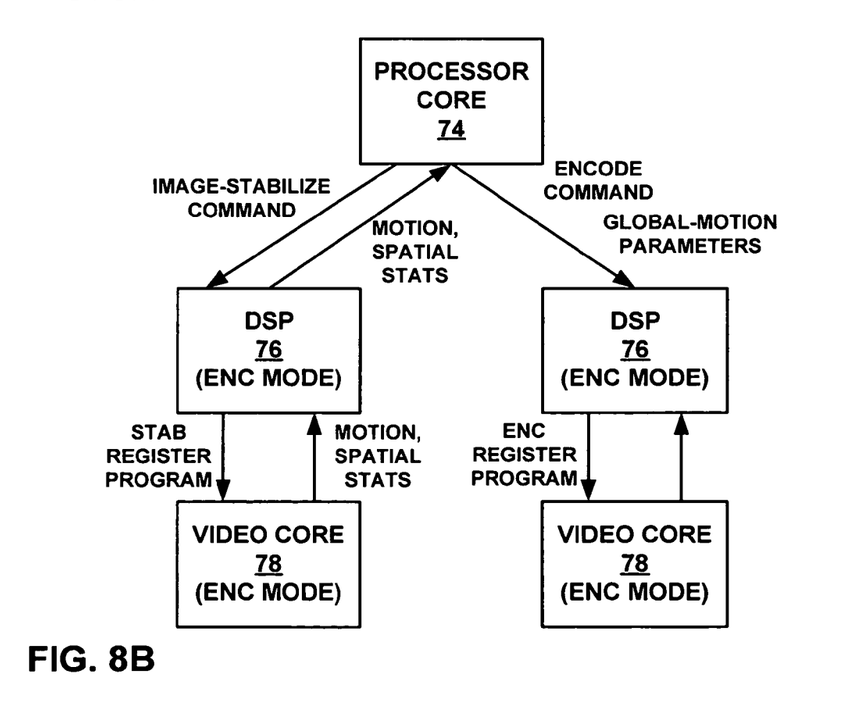

FIG. 8B is a block diagram illustrating another option for implementing image stabilization on the MSM7K platform. In this option, processor core 74 need only implement an "image stabilization" command that would adaptively control the electronic image stabilization techniques described above. Processor core 74 issues the "image stabilization" command before issuing the "encode command" for encoding a frame. The "image stabilization" command instructs DSP 76 to encode only a subset of the frame, i.e., a region R. This may allow a scalable interface for implementing the electronic image stabilization techniques of this disclosure. The rest of the steps are substantially identical to those of FIG. 8A.

Figure 8C:
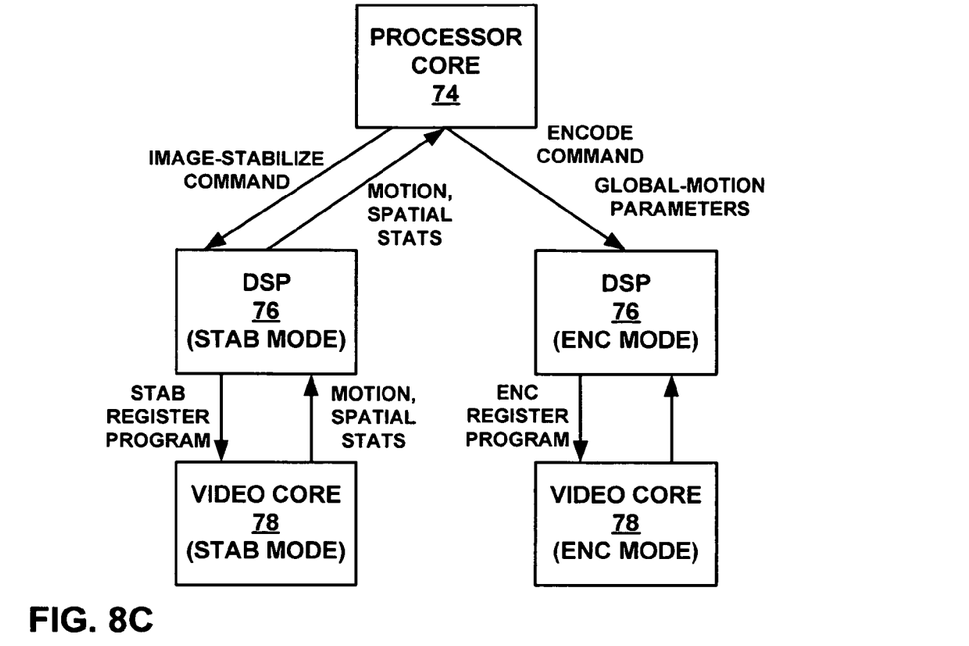

FIG. 8C is a block diagram illustrating a further option for implementing image stabilization on the MSM7K platform. This option requires implementing a new functionality known as a stabilization mode ("stab" mode) on DSP 76. The stabilization mode allows only a subset of video core 78 to be run. In particular, rather than running all operations necessary for encoding, a subset of the operations sufficient to support spatial and motion estimation for image stabilization may be run. This may aid in reducing the time consumed during the image stabilization phase. The rest of the steps are substantially identical to those of FIG. 8B.

Figure 8D:
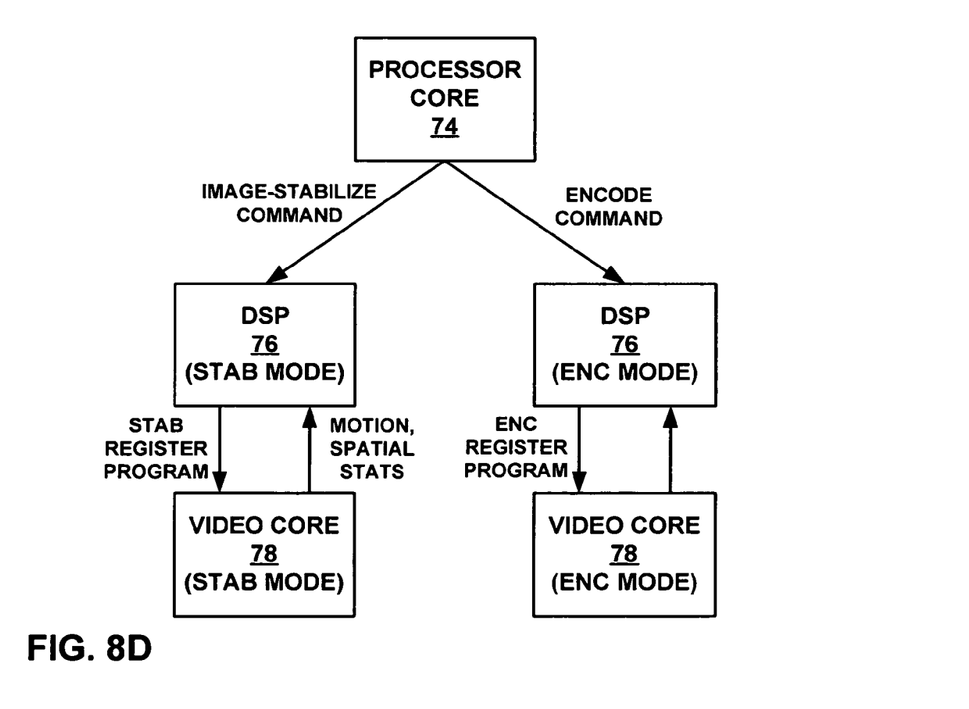

FIG. 8D is a block diagram illustrating yet another option for implementing image stabilization on the platform of FIG. 7. This option requires implementing the motion integration steps of the algorithm within DSP 76. This may minimize the amount of communication necessary between processor core 74 and DSP 76 (i.e., communication of motion and spatial statistics on a per macroblock basis). Thus, processor core 74 issues a single command (encode and stabilize combined) per frame. DSP 76 performs image stabilization including motion integration and determining the global motion vector, and then encodes the frame while factoring in the global motion vector.

Figure 9:
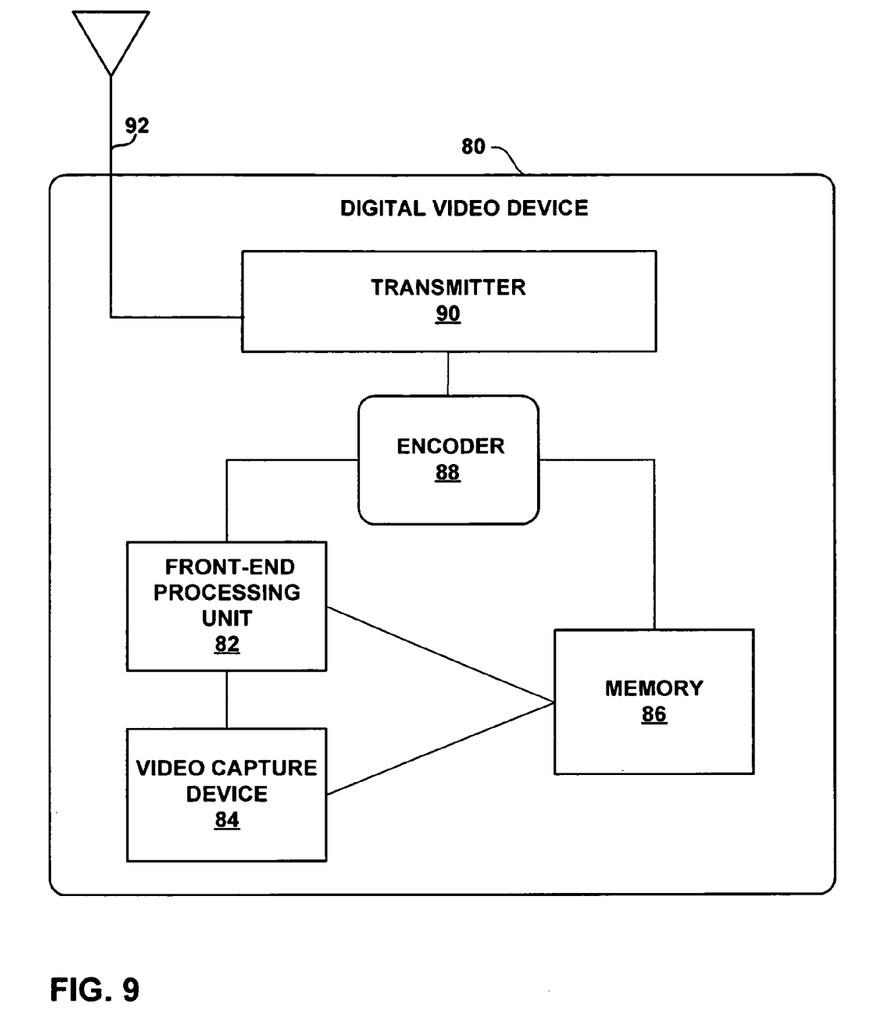
FIG. 9 is a block diagram illustrating an exemplary wireless communication device in which the image stabilization techniques of the disclosure may be implemented.

FIG. 9 is a block diagram illustrating an exemplary digital video device 80 in which the techniques of the disclosure may be implemented. Digital video device 80 may operate as a source device that wirelessly transmits an encoded sequence of video data to a receiving device (not shown). Similarly, digital video device 80 may operate as a receive device capable of wirelessly receiving and decoding video data. Digital video device may support video broadcasts, video conferencing, video telephony, or any other application requiring the transmission of video. For example, digital video device 80 may be a wireless communication device such as a cellular or satellite radio telephone, or a personal digital assistant (PDA).

Front-end processing unit 82 may be used to process video frames captured by video capture device 84 according to the image stabilization techniques described above. Memory 86 may store video sequences. For example, memory 86 may store a current frame to be used as a reference for stabilizing and encoding a subsequent frame. An encoder 88 may encode the stored video sequences using compression algorithms. Encoder 88 may include, for example, various hardware, software or firmware, or one or more DSPs that execute programmable software modules to control the video encoding techniques, as described herein. Digital video device 80 also includes a transmitter 20 to transmit the encoded sequences via wireless antenna 92 to a receiving device (not shown).

The techniques described in this disclosure may be implemented in hardware, software, firmware or any combination thereof. For example, various aspects of the techniques may be implemented within one or more microprocessors, DSPs, application specific integrated circuits (ASICs), field programmable logic arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry.

When implemented in software, the functionality ascribed to the systems and devices described in this disclosure may be embodied as instructions on a computer-readable medium such as random access memory (RAM), read-only memory (ROM), non-volatile random access memory (NVRAM), electrically erasable programmable read-only memory (EEPROM), FLASH memory, magnetic media, optical media, or the like. The instructions are executed to support one or more aspects of the functionality described in this disclosure Various embodiments have been described. The embodiments described are for exemplary purposes only. These and other embodiments are within the scope of the following claims.

The invention claimed is:

1. A device comprising:
    a spatial estimation module that generates spatial statistics for macroblocks within a video frame;
    a motion estimation module that generates motion statistics for the macroblocks within the video frame;
    a motion integration module that integrates the spatial statistics and the motion statistics to determine a global motion vector for the frame; and
    a stabilization module that applies an offset to an image defined by the macroblocks based on the global motion vector.

2. The device of claim 1, wherein the spatial statistics comprise a mean and a variance of video information associated with each of the macroblocks.

3. The device of claim 1, wherein the motion statistics comprise motion vectors indicating movement between the macroblocks and corresponding macroblocks in a previous video frame.

4. The device of claim 3, wherein the motion statistics include sum-of-absolute-difference (SAD) values indicating differences between the macroblocks and the corresponding macroblocks in the previous frame.

5. The device of claim 3, wherein the motion estimation module adaptively selects a search area center of the previous frame, and compares the macroblock to macroblocks of the previous frame in a search area associated with the search area center to find a best-matching macroblock of the previous frame.

6. The device of claim 1, wherein the motion integration module builds a two-dimensional (2D) histogram comprising bins corresponding to each of a plurality of possible motion vectors, and designates the motion vector associated with the bin having the maximum value as the global motion vector.

7. The device of claim 1, further comprising:
    a digital signal processor; and
    a processor core that issues two encode commands to the digital signal processor, wherein upon receiving the first encode command the digital signal processor causes the spatial estimation module to obtain spatial statistics and the motion estimation module to obtain motion statistics, and wherein the processor core causes the motion integration module to integrate the spatial statistics and the motion statistics of each of the macroblocks to determine the global motion vector for the frame.

8. The device of claim 7, wherein the processor core programs the digital signal processor with the global motion vector, and wherein upon receiving the second encode command the digital signal processor performs encoding of the image as offset by the motion compensation module.

9. The device of claim 1, further comprising:
a digital signal processor; and
a processor core that issues an image stabilization command to the digital signal processor that instructs the digital signal processor to perform image stabilization on a region R consisting of a subset of the macroblocks of the frame, wherein the motion integration module determines the global motion vector for the frame based on the motion statistics and spatial statistics of each of the macroblocks within the region R.

10. The device of claim 9, further comprising a video core, wherein the digital signal processor implements a stabilization mode, and wherein the stabilization mode allows the device to run only a subset of the video core.

11. The device of claim 1, further comprising:
a digital signal processor that causes the motion integration module to integrate the spatial statistics and the motion statistics of each of the macroblocks to determine a global motion vector for the frame; and
a processor core that issues a command to the digital signal processor that instructs the digital signal processor to perform image stabilization and encoding of the frame.

12. The device of claim 1, further comprising an image capture apparatus that captures the image.

13. The device of claim 1, wherein the device performs the spatial estimation and the motion estimation on sixteen-pixel by sixteen-pixel macroblocks.

14. The device of claim 1, wherein the device includes at least one of a wireless communication device, a personal digital assistant, a laptop computer, a desktop computer, a digital camera, a digital recording device, a cellular radiotelephone having video capabilities, and a satellite radiotelephone having video capabilities.

15. The device of claim 1, further comprising a transmitter to transmit video frames processed by the spatial estimation module, the motion estimation module, the motion integration module, and the motion compensation module.

16. A method of performing electronic image stabilization comprising:
generating spatial statistics for macroblocks within a video frame;
generating motion statistics for the macroblocks within the video frame;
integrating the spatial statistics and the motion statistics to determine a global motion vector for the frame; and
applying an offset to an image defined by the macroblocks based on the global motion vector.

17. The method of claim 16, wherein generating spatial statistics comprises obtaining the mean and the variance of each of the macroblocks.

18. The method of claim 16, wherein the motion statistics comprise motion vectors indicating movement between the macroblocks and corresponding macroblocks in a previous video frame.

19. The method of claim 16, wherein generating motion statistics comprises determining a motion vector for the macroblock and a sum-of-absolute-difference (SAD) between the macroblock and a macroblock from a previous frame.

20. The method of claim 19, wherein determining the motion vector comprises:
adaptively selecting a search area center; and
comparing the macroblock to macroblocks in a search area associated with the search area center of the previous frame to find a best-matching macroblock of the previous frame.

21. The method of claim 16, wherein integrating the spatial statistics and the motion statistics comprises building a two-dimensional (2D) histogram comprising bins corresponding to each of a plurality of possible motion vectors, and designating the motion vector associated with the bin having the maximum value as the global motion vector.

22. The method of claim 16, further comprising:
defining a subset of the macroblocks within the frame as a region R; and
determining the global motion vector for the frame based on the motion statistics and spatial statistics of each of the macroblocks within the region R.

23. An apparatus for use with a video encoding device, the apparatus comprising:
a computer-readable medium having stored thereon processor-executable instructions that upon execution by a processor of the device cause the device to:
generate spatial statistics for macroblocks within a video frame;
generate motion statistics for the macroblocks within the video frame;
integrate the spatial statistics and the motion statistics to determine a global motion vector for the frame; and
apply an offset to an image defined by the macroblocks based on the global motion vector.

24. The apparatus of claim 23, wherein the instructions cause the processor to generate spatial statistics by obtaining the mean and the variance of each of the macroblocks.

25. The apparatus of claim 23, wherein the motion statistics comprise motion vectors indicating movement between the macroblocks and corresponding macroblocks in a previous video frame.

26. The apparatus of claim 23, wherein the instructions cause the processor to generate motion statistics by determining a motion vector for the macroblock and a sum-of-absolute-difference (SAD) between the macroblock and a macroblock from a previous frame.

27. The apparatus of claim 23, further comprising instructions stored on the computer-readable medium that upon execution by the processor in a device cause the device to:
build a two-dimensional (2D) histogram comprising bins corresponding to each of a plurality of possible motion vectors; and
designate the motion vector associated with the bin having the maximum value as the global motion vector.

28. The apparatus of claim 23, further comprising instructions stored on the computer-readable medium that upon execution by the processor in the device cause the device to:
define a subset of the macroblocks within the frame as a region R; and
determine the global motion vector for the frame based on the motion statistics and spatial statistics of each of the macroblocks within the region R.

29. A device for performing electronic image stabilization comprising:
means for generating spatial statistics for macroblocks within a video frame;
means for generating motion statistics for the macroblocks within the video frame;

means for integrating the spatial statistics and the motion statistics to determine a global motion vector for the frame; and means for applying an offset to an image defined by the macroblocks based on the global motion vector.

30. The device of claim 29, wherein the means for generating spatial statistics comprises means for obtaining the mean and the variance of each of the macroblocks.

31. The device of claim 29, wherein the motion statistics comprise motion vectors indicating movement between the macroblocks and corresponding macroblocks in a previous video frame.

32. The device of claim 29, wherein the means for generating motion statistics comprises means for determining a motion vector for the macroblock and a sum-of-absolute-difference (SAD) between the macroblock and a macroblock from a previous frame.

33. The device of claim 32, wherein the means for determining the motion vector comprises:

means for adaptively selecting a search area center; and means for comparing the macroblock to macroblocks in a search area associated with the search area center of the previous frame to find a best-matching macroblock of the previous frame.

34. The device of claim 29, wherein the means for integrating the spatial statistics and the motion statistics comprises means for building a two-dimensional (2D) histogram comprising bins corresponding to each of a plurality of possible motion vectors, and means for designating the motion vector associated with the bin having the maximum value as the global motion vector.

35. The device of claim 29, further comprising:

means for defining a subset of the macroblocks within the frame as a region R; and means for determining the global motion vector for the frame based on the motion statistics and spatial statistics of each of the macroblocks within the region R.

* * * * *